(12) United States Patent
Guill, Jr. et al.

(10) Patent No.: US 12,096,235 B2
(45) Date of Patent: Sep. 17, 2024

(54) NETWORK EXPANSION OPTIMIZATION

(71) Applicant: T-Mobile Innovations LLC, Overland Park, KS (US)

(72) Inventors: Dennis Jarret Guill, Jr., Richardson, TX (US); Allan Orbigo, Bothell, WA (US); Jong Sung Yoon, Sammamish, WA (US)

(73) Assignee: T-Mobile Onnovations LLC, Overland Park, KS (US)

( * ) Notice: Subject to any disclaimer, the term of this patent is extended or adjusted under 35 U.S.C. 154(b) by 345 days.

(21) Appl. No.: 17/557,958

(22) Filed: Dec. 21, 2021

(65) Prior Publication Data
US 2023/0199512 A1 Jun. 22, 2023

(51) Int. Cl.
*H04W 16/18* (2009.01)
*H04W 24/08* (2009.01)

(52) U.S. Cl.
CPC ........... *H04W 16/18* (2013.01); *H04W 24/08* (2013.01)

(58) Field of Classification Search
CPC ..... H04W 16/18; H04W 24/08; H04W 24/02; H04W 64/003
See application file for complete search history.

(56) References Cited

U.S. PATENT DOCUMENTS

| | | | |
|---|---|---|---|
| 7,158,790 B1 * | 1/2007 | Elliott | H04W 16/00 455/457 |
| 7,519,372 B2 * | 4/2009 | MacDonald | H04L 43/16 455/457 |
| 9,628,359 B1 * | 4/2017 | Jain | H04L 41/0813 |
| 11,375,472 B2 * | 6/2022 | Rydén | H04W 72/51 |
| 2006/0229087 A1 * | 10/2006 | Davis, III | H04W 36/26 455/433 |
| 2009/0298437 A1 * | 12/2009 | Hoefel | H04W 48/16 455/67.11 |

* cited by examiner

*Primary Examiner* — Rasheed Gidado
(74) *Attorney, Agent, or Firm* — Shook, Hardy & Bacon L.L.P.

(57) ABSTRACT

Systems and methods are provided herein to dynamically and efficiently optimize network expansion of a network carrier based on UE data collected from a plurality of user equipment (UEs). The UE data is processed based on different computerized algorithms to locate optimal locations for adding a new access point to expand the network. Aspects herein are also directed to systems and methods for generating and displaying dynamic maps on graphical user interfaces (GUI) in accordance with aspects herein.

14 Claims, 8 Drawing Sheets

NETWORK EXPANSION OPTIMIZATION

BACKGROUND

Currently, network expansion decisions are made by measuring coverage of a network of the network carrier at particular geographic locations. If a gap in network coverage is identified, the network carrier can determine whether a new access point (e.g., a new cell site) would make business sense and provide an improved quality of service to a subscriber user equipment (UE/UEs). For example, presently, if network expansion is being considered for a particular geographic location of interest, the network carrier deploys an employee to drive through the particular geographic location of interest to perform a drive test for signal detection by one or more UEs and to collect network coverage data. Additionally, the network carrier may try to access Census data to make network expansion determinations, which may not always be reliable since it may be outdated at the time the network carrier accesses the Census data to make network expansion determinations. The current methods outlined above, therefore, require significant human and other resources to be allocated to the task. As such, a more efficient and up-to-date process of collecting and processing the necessary data for supporting network expansion decisions for a network carrier is needed.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for implementing computerized algorithms useable for computing optimal location(s) for network expansion are disclosed. Generally, when a UE subscribes to a network of a network carrier and connects to the network, the UE is configured to collect UE data regarding the UE including, for example, a service state of the UE, a particular geographic location of the UE with a time stamp, an identification code of the UE (UE ID code), an identification code of the cell (Cell ID) providing service to the UE at the particular geographic location and time, an identification code of a network carrier (Carrier ID) providing service to the UE at the particular geographic location and time, and the like.

The present systems and methods address the shortcomings of current and old methods of planning and implementing network expansion by harnessing the UE data collected from a plurality of user equipment (UEs) and implementing computerized algorithms to efficiently optimize network expansion of a network carrier. Particularly, the present systems are more efficient than older systems because they allow a network carrier to access greater numbers of geographic locations because the necessity for presence based drive by network tests are reduced or eliminated.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, pre-coding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

In accordance with aspects herein, the UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

Based on the UE data, aspects herein include systems, methods, and computer readable media for optimizing a carrier's network expansion for a network carrier (i.e., home network carrier) to identify optimal sites for new access points such as, for example, new base stations, antennas, cells, and the like to expand the carrier's network, allowing it to cover a larger geographic area for provision of, for example, wireless services. As provided briefly above, the current methodologies used for network expansion are largely analog and require significant human and other resources. Additionally, the Census information that may be used and accessed for network expansion purposes may be outdated. As such, the identification or determination of optimal sites for new access points based on current methodologies may be miscalculated resulting in large negative economic impact with little benefit to the network coverage of the network carrier in being able to provide, for example, wireless services to a greater population by covering a larger number of geographic locations.

In accordance with a first aspect of the present disclosure, a system that takes advantage UE data collected from a plurality of UEs subscribed to a home network carrier, is provided. The system uses the UE data to identify optimal locations for new access points to efficiently expand the home network carrier's network with the greatest impact to the network. As provided briefly above, a UE is capable of collecting UE data, which is information about its service state status, its current geographic location, a current time, a wireless signal strength, available networks, channel quality, and the like, as long as it is powered on and connected to its home network carrier. For example, the UE may collect and initially store the UE data at a memory of the UE, which may be accessed and retrieved by the home network carrier at predetermined time intervals (e.g., minutes, hours, days, months and the like) by the home network carrier of the UE. The UE may be configured to automatically manage the UE data collected and saved in the memory of the UE by automatically deleting old UE data at predetermined time intervals (e.g., minutes, hours, days, and the like) to make space for new UE data. Alternatively, the UE may alert a user of the UE to clear the memory to make room for new data, or the network carrier may remotely manage at least a portion of the memory of the UE by automatically deleting data from the memory of the UE as it is retrieved by the home network carrier.

The home network carrier may store the data retrieved from the UE at one or more network databases that may be physical or cloud based. The home network carrier may then access and process the UE data according to aspects disclosed herein. The one or more network databases comprise UE data collected from a plurality of UEs subscribed to the home network carrier. The home network carrier uses one or more processors to process the UE data collected from the plurality of UEs based on a computer based algorithm or data structure.

The system in accordance with aspects herein determines one or more geographic locations and divides the one or more geographic locations into a plurality of geographic areas having a predetermined shape and size. For example, each geographic area in the plurality of geographic areas may be defined by a hexagon shape where each vertex of the hexagon corresponds to a specific latitude and longitude coordinate on a map. The hexagon shapes for each of the plurality of geographic areas may be contiguously stacked on the map (i.e., with overlapping perimeters) so that collectively, they cover a geographic location of interest. A size for each geographic area may be predetermined by the home network carrier based on a desired granularity (i.e., level of detail) desired for the computer based algorithm or data structure. For example, each geographic area may be 0.1 km$^2$, 0.2 km$^2$, 0.5 km$^2$, 1 km$^2$, 1.5 km$^2$, 2 km$^2$, 2.5 km$^2$, 3 km$^2$, 3.5 km$^2$, 4 km$^2$, etc. Each geographic area may have zero or at least one UE that is powered on and collecting UE data.

Based on the UE data collected from a plurality of UEs at a particular geographic location of interest, the system determines a coverage rate for each geographic area and identifies a cluster of geographic areas that have a coverage rate that is below a predetermined threshold based on a plurality of UEs in the cluster of geographic areas having a service state that indicates that they are in emergency only service or they are out of service. As such, the home network carrier is able to locate geographic locations where there is a gap in service.

Further, the system automatically identifies a dominant network carrier (e.g., home network carrier or alternative available network carrier(s) that provide, for example, wireless services at the cluster of geographic areas), based on the UE data collected, which includes, for example, location, available networks, signal strength, service state, and the like. Further, the system also automatically calculates potential access point location(s) for the dominant network carrier based on a signal strength detected by each UE in the plurality of UEs located in the cluster of geographic areas.

Based on the calculated potential access point location(s) for the dominant network carrier, the home network carrier can determine an optimal location for a new access point for the home network carrier. For instance, the home network carrier can make a determination of whether a new access point needs to be built, or whether the home network carrier can rent space at the same location as the alternative network carrier's access point that is already in place, as calculated in accordance with aspects herein. As such, the home network carrier can quickly and efficiently calculate new access point location(s) for effective expansion of its network using minimal resources and taking advantage of data that is available through a plurality of UEs that are subscribed to it.

A second aspect of the present disclosure is directed to a computer implemented method for determining an optimal location for a new access point. The computer implemented method is performed by one or more processors of the home network carrier. The computerized method may include the steps of retrieving UE data from a plurality of UEs, storing the UE data in a database of the home network carrier, processing the data to determine a plurality of geographic areas of a predetermined size, computing a coverage rate for each geographic area in the plurality of geographic areas, determining a cluster of geographic areas in the plurality of geographic areas having a coverage rate that is below a predetermined threshold, determining a dominant network carrier in the cluster of geographic areas, and determining a signal strength of a network of the dominant network carrier in the cluster of geographic areas.

Another aspect of the present disclosure is directed to a computer implemented method for generating an interactive graphical user interface that is configured to display network coverage information. The method includes the steps of retrieving UE data from a plurality of UEs subscribed to a home network carrier, where the UE data includes at least a service state and a geographic location of each UE of the plurality of UEs, storing the UE data in a database of the home network carrier, processing the UE data stored in the database for computing a coverage rate for each geographic area in a plurality of geographic areas, determining a first cluster of geographic areas in the plurality of geographic areas having a first coverage rate that is below a predetermined threshold, determining a second cluster of geographic areas in the plurality of geographic areas having a second coverage rate that is above the predetermined threshold, displaying on the graphical user interface a dynamic map with different visual characteristics for the first cluster of geographic areas and the second cluster of geographic areas, respectively. Further, the computer implemented method includes determining a dominant network carrier in the first cluster of geographic areas in the plurality of geographic areas, and dynamically changing the GUI to display a presence of the dominant network carrier for each of the first cluster of geographic areas and the second cluster of geographic areas using differentiating visual characteristics (i.e., using different colors). Furthermore, the computer implemented method further includes determining a signal strength of a network of the dominant network carrier in at least the first cluster of geographic areas, determining a potential location of a cell site of the dominant network carrier providing service to the first cluster of geographic areas based on the signal strength, and displaying the potential location of the access point of the dominant network carrier on the dynamic map.

Figure 1:
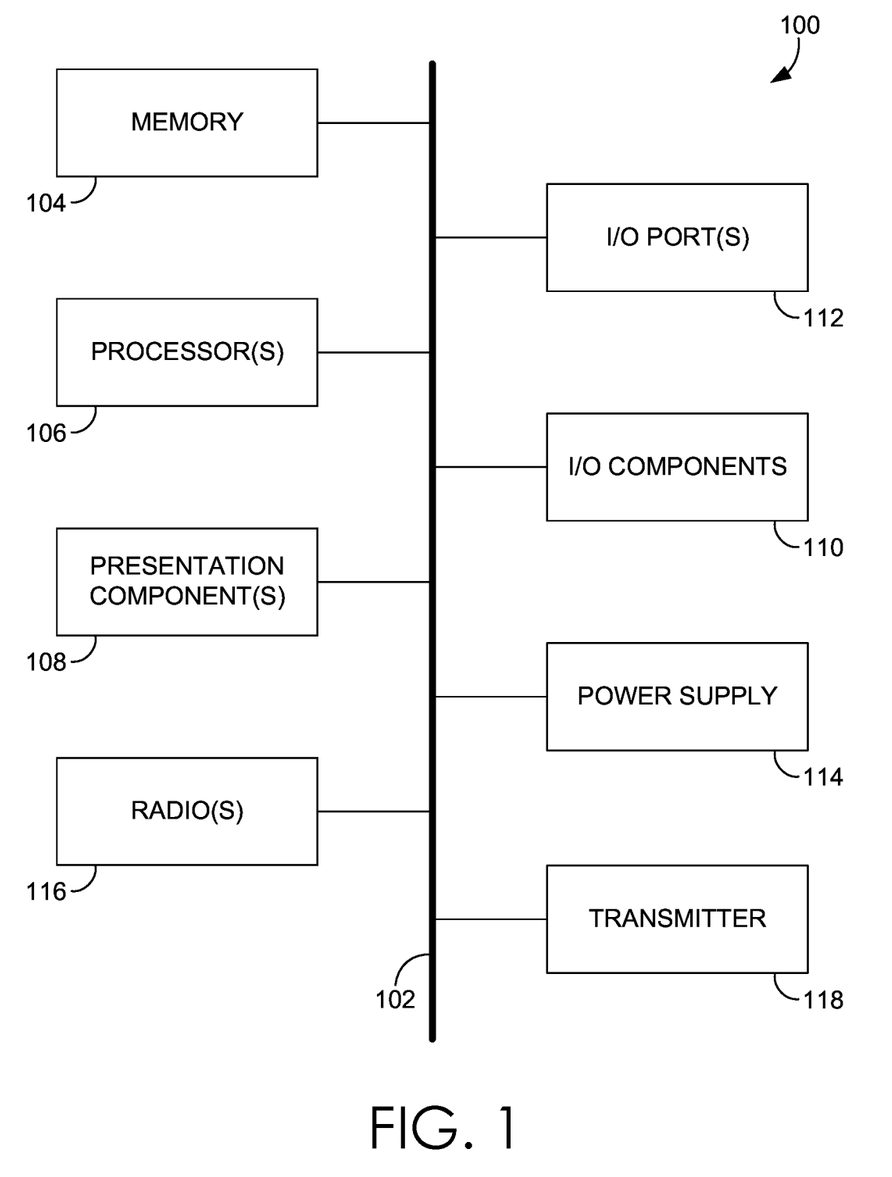
FIG. 1 depicts a diagram of an exemplary network environment in which implementations of the present disclosure may be employed, in accordance with aspects herein.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
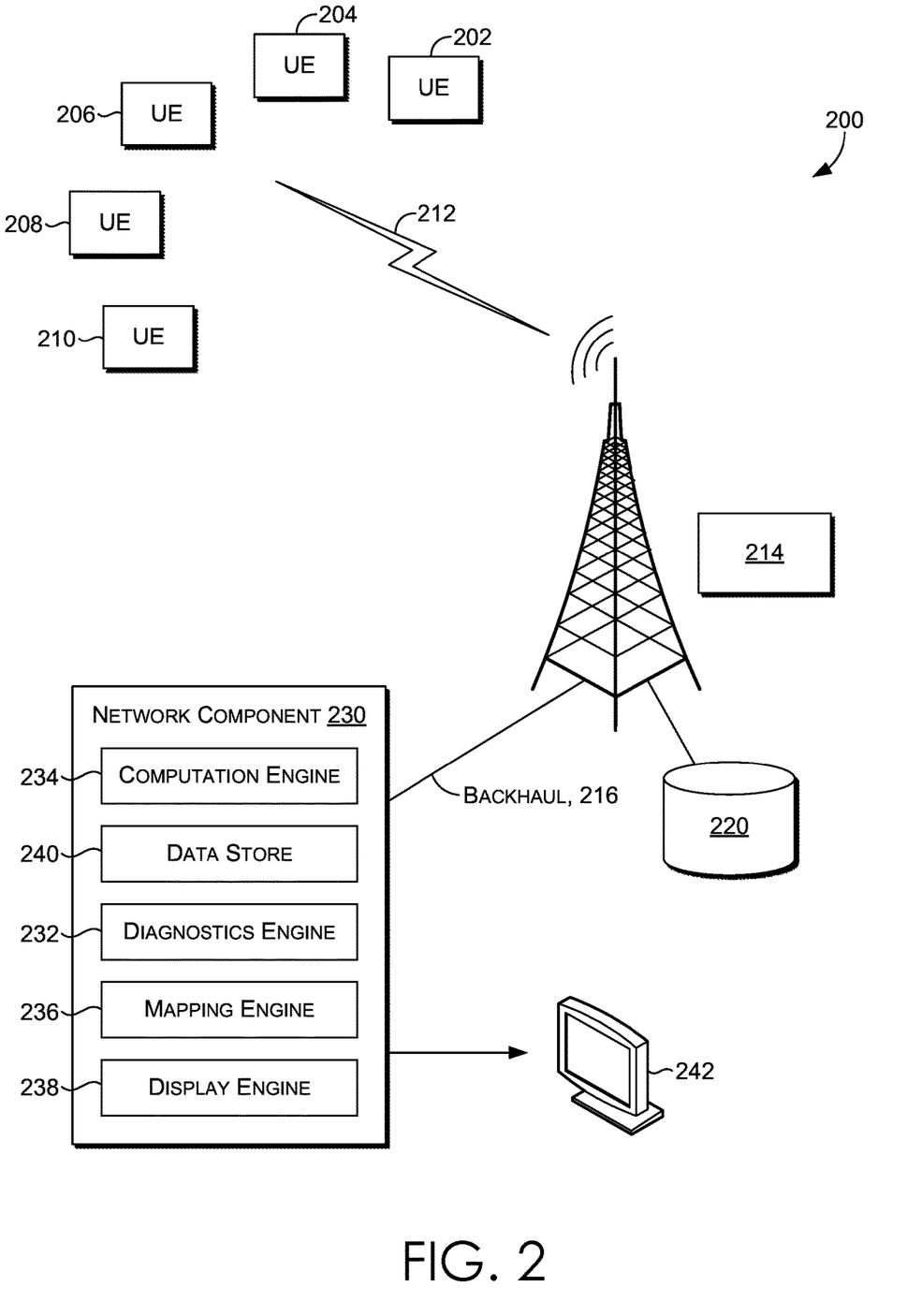
FIG. 2 depicts a computing environment suitable for use in implementations of the present disclosure, in accordance with aspects herein.

Next, FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, a UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with a network component 230 and at least a network database 220 via a backhaul channel 216. As the UEs 202, 204, 206, 208, and 210 collect individual status data, the status data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the status data from the UEs 202, 204, 206, 208, and 210, and similarly store the data in the network database 220. The data may be communicated or retrieved and stored periodically within a predetermined time interval which may be in seconds, minutes, hours, days, months, years, and the like. With the incoming of new data, the network database 220 may be refreshed with the new data every time, or within a predetermined time threshold so as to keep the status data stored in the network database 220 current. For example, the data may be received at or retrieved by the access point 214 every 10 minutes and the data stored at the network database 220 may be kept current for 30 days, which means that status data that is older than 30 days would be replaced by newer status data at 10 minute intervals. As described above, the status data collected by the UEs 202, 204, 206, 208, and 210 can include, for example, service state status, the respective UE's current geographic location, a current time, a strength of the wireless signal, available networks, and the like.

The network component 230 comprises various engines including a diagnostics engine 232, a computation engine 234, a mapping engine 236, a display engine 238, and a data store 240. All determinations, calculations, and data further generated by the diagnostics engine 232, the computation engine 234, the mapping engine 236, and the display engine 238 may be stored at the data store 240. Although the network component 230 is shown as a single component comprising the diagnostics engine 232, the computation engine 234, the mapping engine 236, the display engine 238, and the data store 240, it is also contemplated that each of the diagnostics engine 232, the computation engine 234, the mapping engine 236, and the display engine 238, and the data store 240 may reside at different locations, be its own separate entity, and the like, within the home network carrier system.

The network component 230 is configured to retrieve the status data from the network database 220 and calculate various values that are useable for displaying a dynamic graphical user interface (GUI). The diagnostics engine 232 determines a service state (i.e., out of service, emergency only service, or in service) of each UE data associated with a chosen geographic location (e.g., state, city, county, town, neighborhood, landmark, and the like) and a particular period or range of time of interest, and the mapping engine 236, and the display engine 238 are configured to generate mapping data and display data to display a dynamic map on a network display device 242, such as map 300, shown in FIG. 3.

Figure 3:
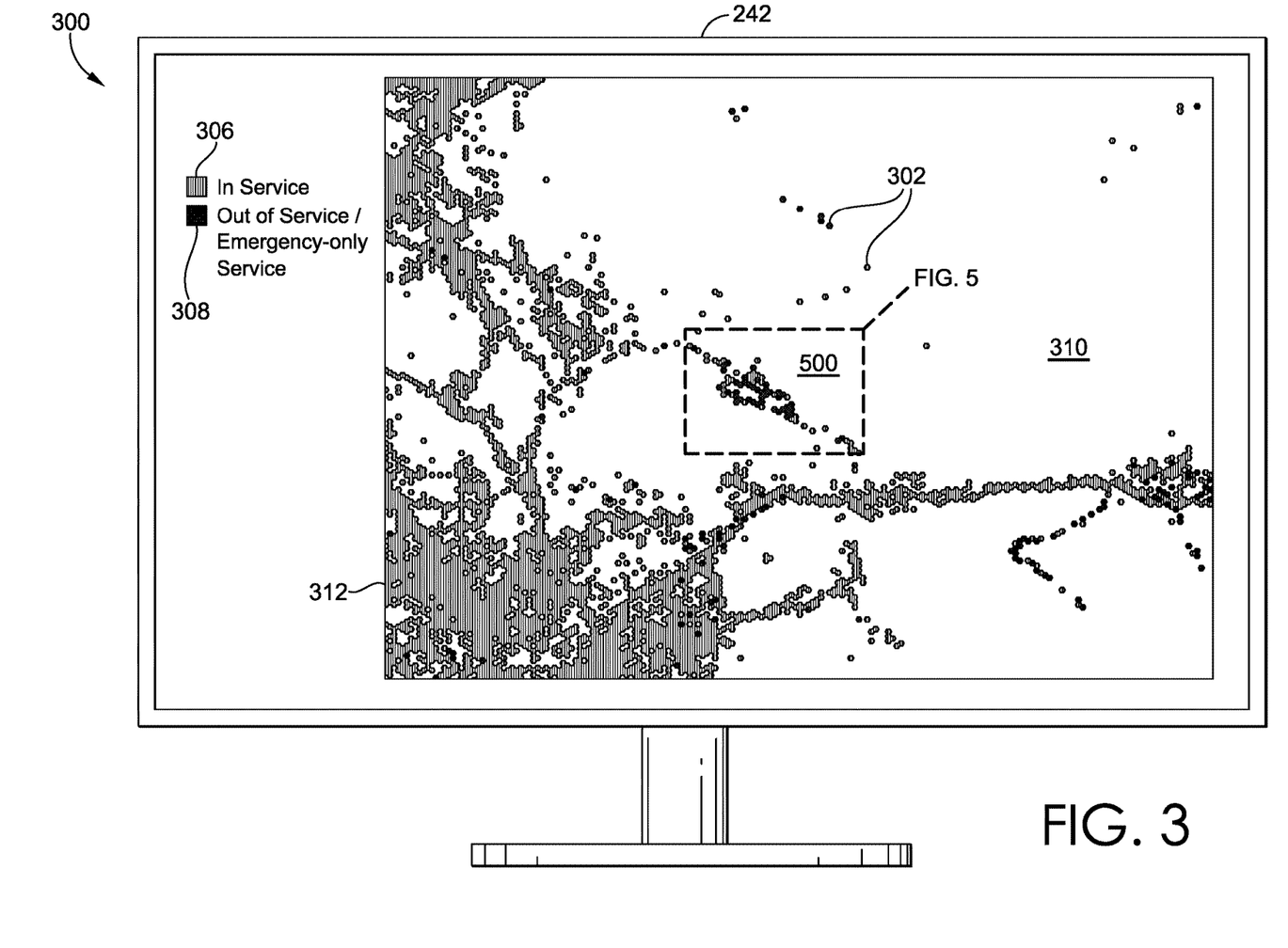
FIG. 3 illustrates a map screen shot in which implementations of the present disclosure may be employed, in accordance with aspects herein.

As shown in FIG. 3, a map 300 of a chosen geographic location is displayed on network display device 242. In the map 300, for example, land masses 312 and water 310 may be presented with different visual characteristics. For example, water 310 is displayed as the blank area(s) and the land masses 312 are shaded/hatched/stippled/colored. Further, the map 300 also shows which land masses 312 have an in service state and which land masses have an out of service or an emergency only service state, with yet further differing visual characteristics, as will be described in greater detail below. The computation engine 234 uses the service state determined by the diagnostics engine 232 to calculate a coverage rate or a no coverage rate. A no coverage rate is determined based on a number of UEs that have an out of service or an emergency only service state divided by a total number of UEs including the UEs that have an in service state. A coverage rate, on the other hand, can be determined based on a number of UEs that have an in service state divided by the total number of UEs including the UEs that have an out of service or an emergency only service state.

Figure 4:
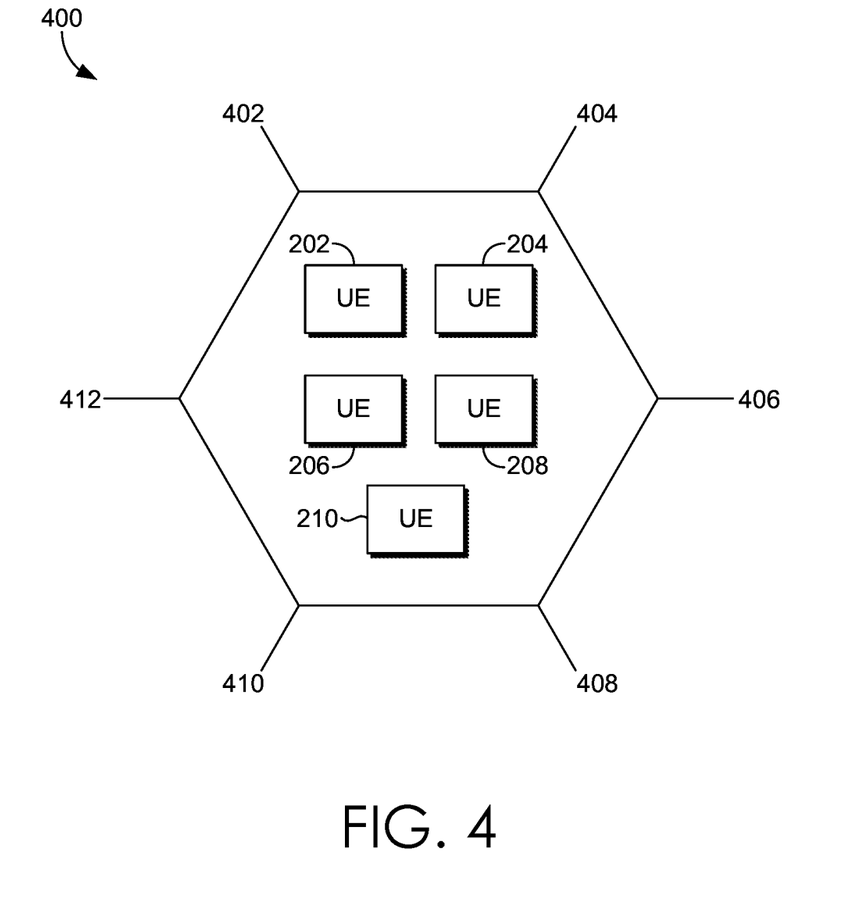
FIG. 4 illustrates a geographic area as defined in accordance with aspects herein.

The computation engine 234 is further configured to determine a plurality of geographic areas within the chosen geographic location. Each geographic area in the plurality of geographic areas may have a particular shape that is stackable such that they can continuously cover the land masses (e.g., land masses 312 in FIG. 3) on any map of any geographic location. For example, as shown in FIG. 4, each geographic area in the plurality of geographic areas may have a hexagonal shape such as hexagon representing a geographic area 400 having vertices 402, 404, 406, 408, 410, and 412, each representing a specific map coordinate comprised of a specific latitude and longitude pair. The size of the geographic area 400 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 4, UEs 202, 204, 206, 208, 210, may be located within geographic area 400 collecting UE data that is useable by network component 230, in accordance with aspects herein.

Based on the service state determinations made by the diagnostics engine 232, computation engine 234 can determine a coverage rate for each of the geographic areas included within a map to classify each geographic area as having a service state classifiable as in service, or out of service/emergency only service, as shown in FIG. 3. The computation engine 234 may, for example, determine a service state of each geographic area based on a majority of UEs at each particular geographic area having a service state of in service or out of service/emergency only service. Based on these determination, a mapping engine, for example, a mapping engine 236 can generate, using the UE data, mapping data to generate a map overlapped with a plurality of geographic areas and display engine 238 can generate display data for displaying the map on a network display device 242, such as map 300 shown in FIG. 3. The network display device 242 may be comprised of any suitable display device for presenting the map 300 and other data to a user. For example, a suitable display device may include a computer monitor, a laptop display, a tablet display, a mobile device display, and the like. The mapping data and the display data may include computer readable instructions for designating different visual characteristics to, for example, each geographic area 302 displayed on the map 300. For example, as shown in FIG. 3, each geographic area 302 determined as having an in service state is displayed with a first visual characteristic 306, and each geographic area determined as having an out of service or emergency only service state is displayed with a second visual characteristic 308. The different visual characteristic may include using, for example, different hatching (as shown), stippling, shading, coloring, and the like, to fill in each geographic area 302. Thus, when the plurality of geographic areas 302 are displayed as a whole as shown, for example, in the map 300, a user can readily observe a pattern and easily locate or determine geographic area clusters of one or more geographic areas 302 where there is a gap in the coverage provided by the home network carrier.

Based on the determination of geographic area clusters where there is a gap in the coverage provided by the home network carrier, the user can determine one or more particular geographic area clusters of interest where expanding the network of the home network carrier would be desirable. For each of the one or more particular geographic area clusters of interest, the network component 230 is configured to calculate a coverage rate at each geographic area cluster to determine a dominant carrier within each geographic area cluster to determine a dominant network carrier at each geographic area cluster of interest. For instance, a coverage rate above a predetermined threshold would indicate that the home network carrier is the dominant network carrier at a particular geographic area cluster. On the other hand, if the coverage rate is below the predetermined threshold, another network is determined to be the dominant carrier at the particular geographic area cluster. Once the dominant carriers are determined at each of the geographic areas 302 or the geographic area cluster(s), the mapping engine 236 and the display engine 238 may then generate mapping data and display data for displaying a GUI with a dynamic map that can be zoomed in, zoomed out, moved, and the like to display a desired geographic location at a desired scaled, on the map. Further, the mapping data and the display data may also include computer readable instructions for providing different visual characteristics to each of the geographic areas 302 displayed on the map based on network coverage characteristics determined for the each geographic area 302. Thus, the map displayed on the GUI can be dynamically changed according to the type of information desired to be displayed on the network display device 242.

Figure 5:
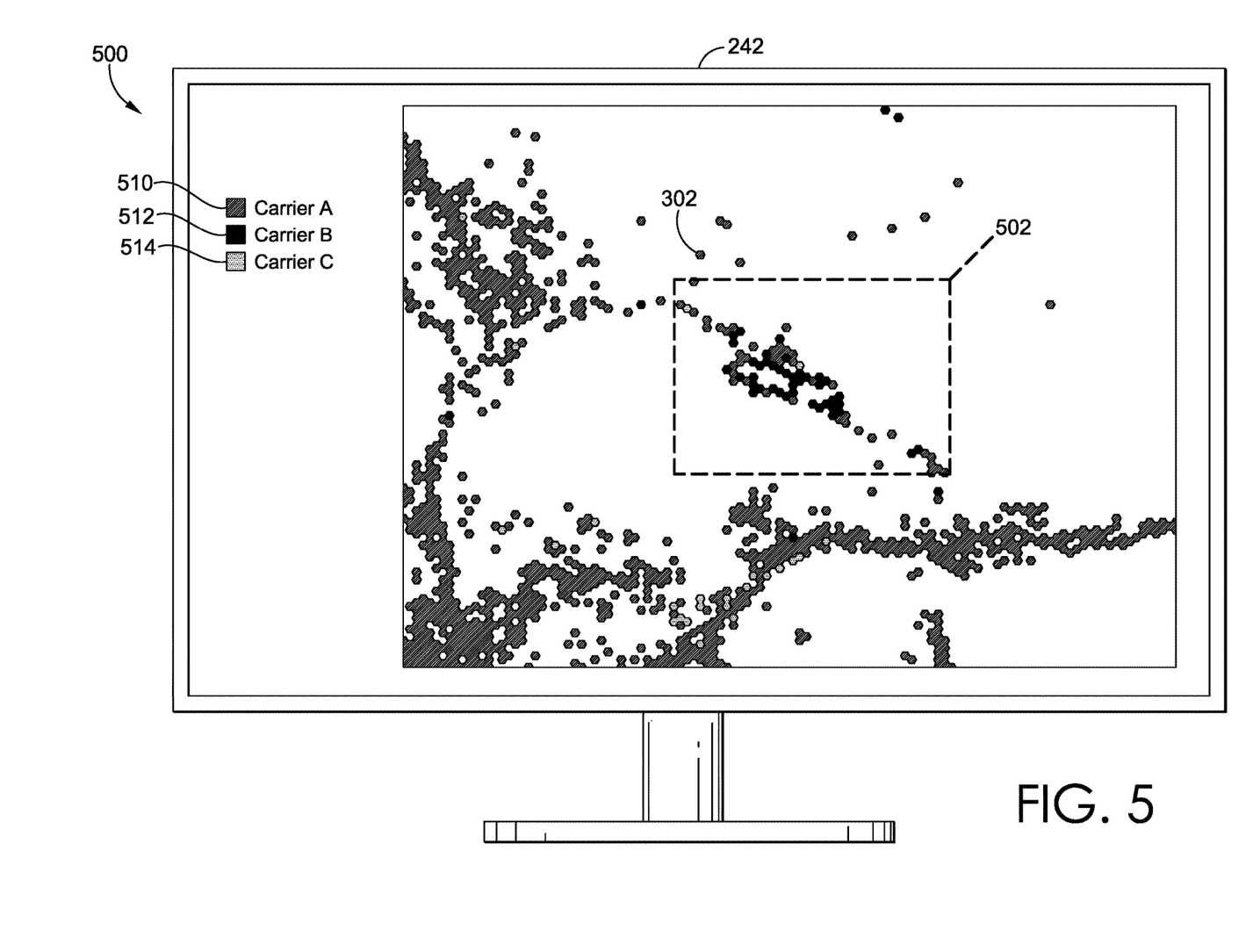
FIG. 5 illustrates a map screen shot in which implementations of the present disclosure may be employed, in accordance with aspects herein.

For example, as shown in FIG. 5, map 500 is displayed, which is a closer or zoomed in view of the map 300 shown in FIG. 3. As shown, in this exemplary map 500, there are three major carriers identified as Carrier A, Carrier B, and Carrier C. Based on an assumption that Carrier A is the home network carrier, Carrier A is shown with a first visual characteristic 510, which carriers over to the map 500 showing each geographic area 302 where Carrier A is the dominant network carrier and/or where the home network carrier is present to provide services to its subscribed UEs with the first visual characteristic 510. Carrier B is shown with a second visual characteristic 520 that is different from the first visual characteristic 510, which as shown in map 500, carries over to each geographic area 302 where Carrier B is the dominant network carrier providing services to UEs in the corresponding geographic areas 302. Finally, Carrier C is shown with a third visual characteristic 530 that is different from the first visual characteristic 510 and second visual characteristic 520. The geographic areas 302, where Carrier C has the stronger presence, are filled in with the third visual characteristic 530. As such, based on the different visual characteristics, a dominant network carrier providing coverage to the geographic area cluster 502 that was previously identified as lacking coverage by the home network carrier, as shown in FIG. 3, can be determined by the network component 230, as further provided below.

According to aspects herein, once the geographic area cluster 502 is identified, the diagnostics engine 232 is configured to analyze the UE data to determine a dominant network carrier providing coverage to UEs at the geographic area cluster 502. Then, based on a signal strength also determined from the UE data, the computation engine 234 is configured to detect access points and calculate or determine approximate locations of the detected access points, where the detected access points can include another network carrier's network, which may be the dominant network carrier at, for example, the geographic area cluster 502. For example, a higher signal strength may be considered as being a proximity indicator of a UE to the access point. Thus, the location of the access point may be determined based on a signal strength. Based on the calculation and determination of the calculated location of the access point in the geographic area cluster 502, the mapping engine 236 and the display engine 238 are configured to generate display data for displaying a map displaying the calculated location of the dominant network carrier's access point, as shown, for example, in FIG. 6.

Figure 6:
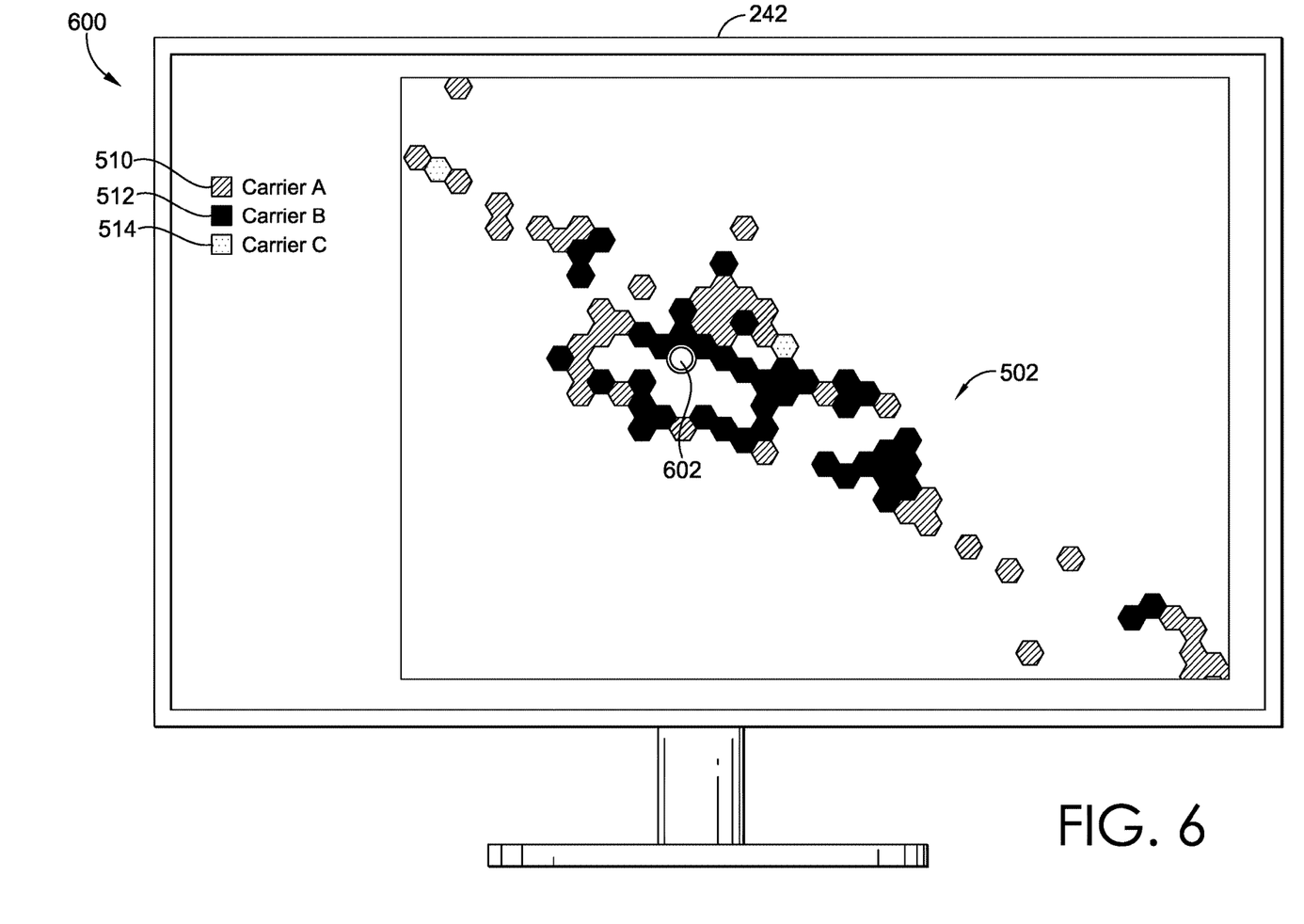
FIG. 6 illustrates a map screen shot in which implementations of the present disclosure may be employed, in accordance with aspects herein.

FIG. 6 shows map 600, which is a zoomed in view of map 500, showing a closer view of the geographic area cluster 502, providing a visual indication with indicator 602 of the calculated location for the access point of the dominant network carrier at the geographic area cluster 502. Based on the knowledge provided by the network component 230, the home network carrier may make a determination of whether the geographic area cluster is a good candidate for network expansion of the home network carrier, whether it would make sense to build a new access point, particularly in instances where there are no access point sites are detected. Alternatively, if an access point of another network carrier is detected as the dominant network carrier at the geographic area cluster 502, such as, for example, shown by indicator 602, the home network carrier may make a determination to expand its network coverage by renting space to set up a home network access point at the same location as the location of the access point of the dominant carrier shown by indicator 602.

Accordingly, according to the aspects herein, a home network carrier can make determinations and calculations for efficiently determining optimal sites for new access points that would allow for home network to expand its reach and provide better and more expansive coverage to subscriber UEs. Further, unlike the old methods used, according to aspects herein, the home network carrier can make these determinations in real time or near real time, based on current data, which makes more sense technically and economically.

Figure 7:
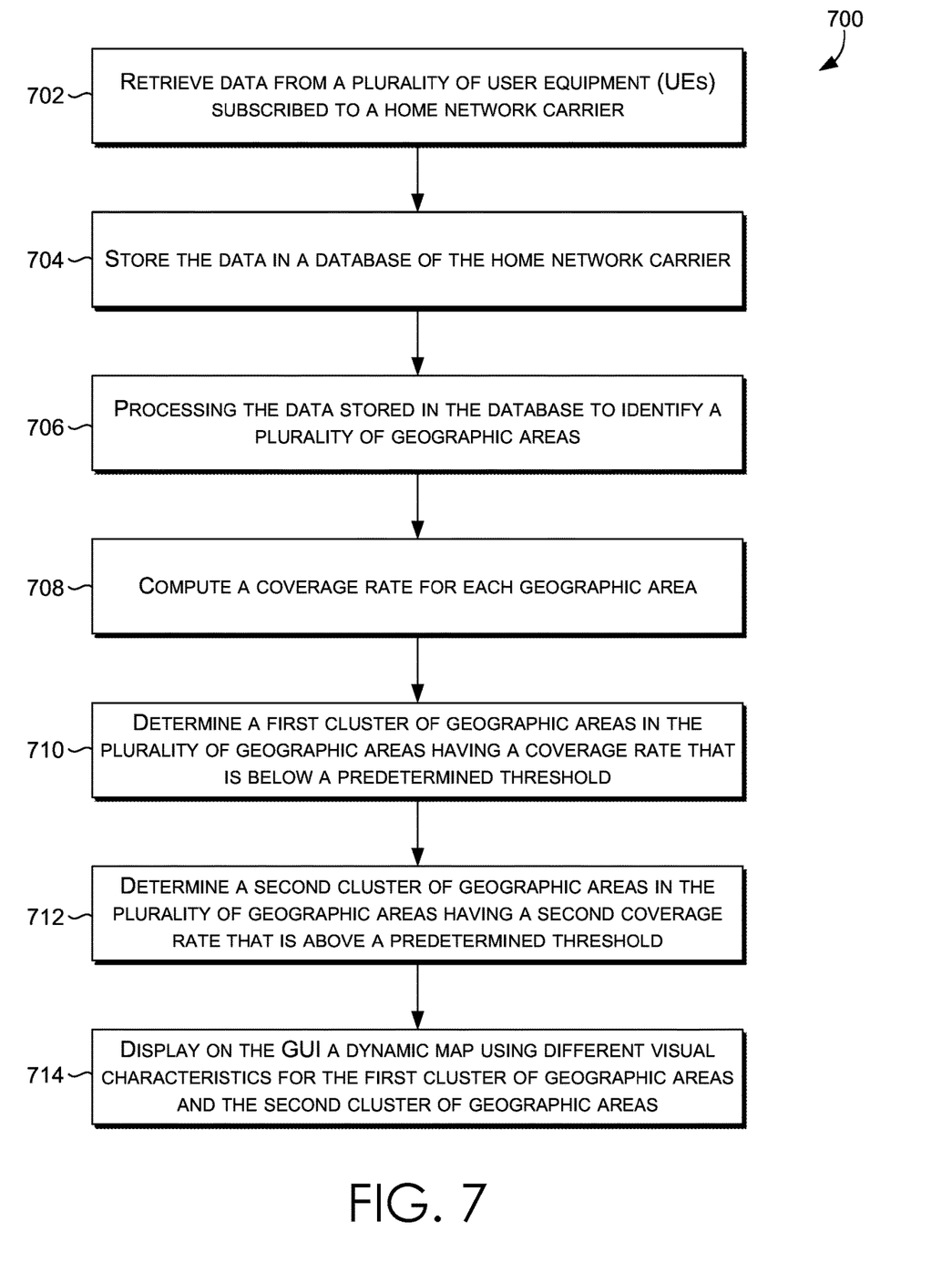
FIG. 7 depicts a flow diagram of an exemplary method for dynamically implementing the computerized algorithms, in accordance with aspects herein.

As depicted in FIG. 7, a method 700 for generating an interactive graphical user interface (GUI) configured to display network coverage information of a home network carrier can include a number of steps, which can occur in the order depicted herein or in any other order without departing from the scope of the technology disclosed herein. Furthermore, one or more steps can be added, omitted, or duplicated without departing from the scope of the technology described herein. As depicted in block 702, the method 700 can include the step of retrieving UE data from a plurality of user equipment (UEs) subscribed to a home network carrier at a particular geographic location within a predetermined time period. The UE data can include a service state of the UE, a particular geographic location of the UE with a time stamp, an identification code of the UE (UE ID code), an identification code of the cell (Cell ID) providing service to the UE at the particular geographic location and time, an identification code of a network carrier (Carrier ID) providing service to the UE at the particular geographic location and time, and the like.

As depicted in block 704, some embodiments of method 700 include a step of storing the UE data in a database of the home network carrier, and as depicted in block 706, the method 700 can include processing the data stored in the database of the home network carrier to identify a plurality of geographic areas. Each geographic area in the plurality of geographic areas can have a particular shape that is stackable on a map. For example, the geographic area can have a hexagonal shape, with each vertex representing a latitude and longitude coordinate of a map. Each geographic area in the plurality of geographic areas can further be of a predetermined size. For example, each geographic area in the plurality of geographic areas may be 0.1 km$^2$, 0.2 km$^2$, 0.5 km$^2$, 1 km$^2$, 1.5 km$^2$, 2 km$^2$, 2.5 km$^2$, 3 km$^2$, 3.5 km$^2$, 4 km$^2$, etc.

As depicted in block 708, some embodiments of method 700 include a step of computing a coverage rate for each geographic area in the plurality of geographic areas using the UE data stored in the database of the home network carrier. Additionally as depicted in block 710, the method 700 can include a step of determining a first cluster of geographic areas in the plurality of geographic areas having a first coverage rate that is below a predetermined threshold and as shown in block 712, determining a second cluster of geographic areas in the plurality of geographic areas having a second coverage rate that is above the predetermined threshold. Furthermore, as depicted in block 714, the method can include displaying on the GUI a dynamic map, wherein the first cluster of geographic areas is shown with a first visual characteristic on the dynamic map, and wherein the second cluster of geographic areas is shown with a second visual characteristic on the dynamic map, wherein the first visual characteristic is visually distinct from the second visual characteristic.

Figure 8:
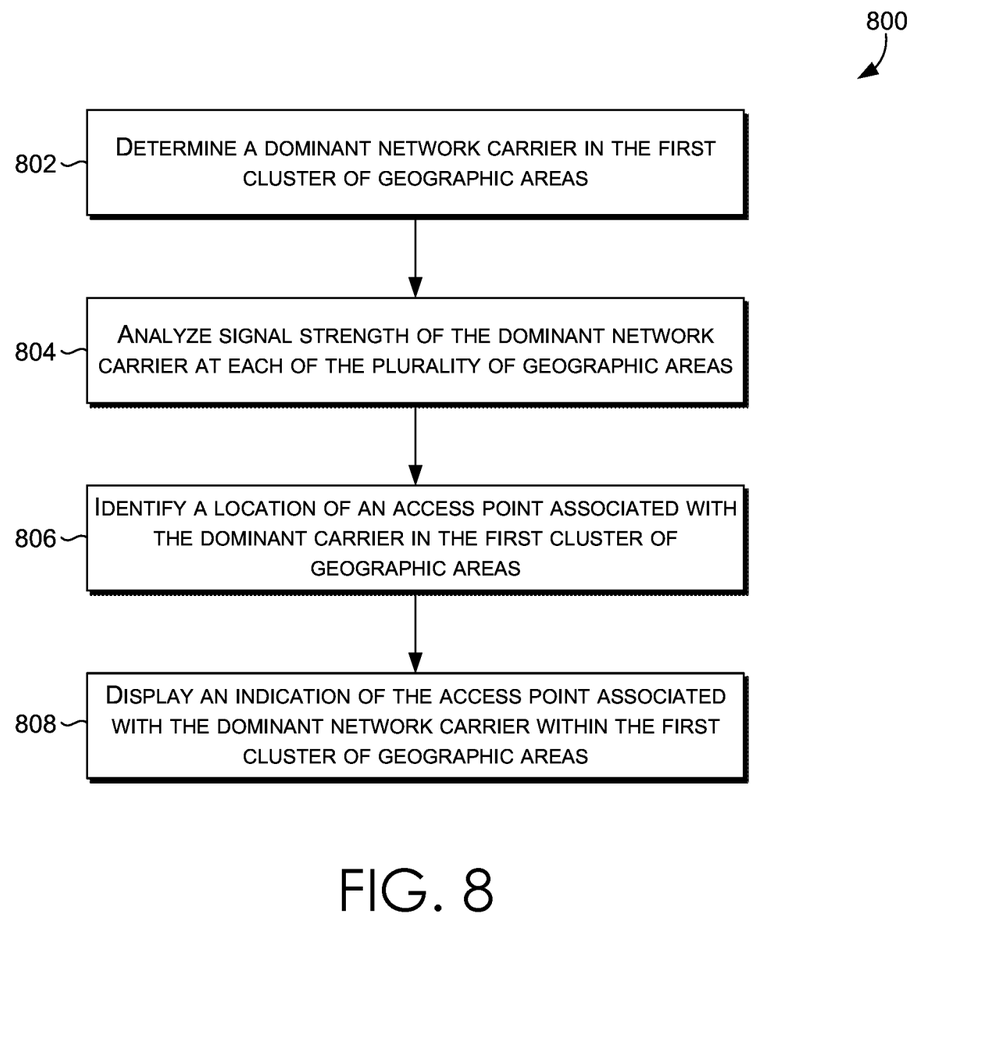
FIG. 8 depicts a flow diagram of an exemplary method for dynamically displaying a graphical user interface, in accordance with aspects herein.

As depicted in FIG. 8, a continuing method 800 from the method 700 displayed in FIG. 7 for displaying an indication of an access point associated with the dominant network carrier within the first cluster of geographic areas, is shown. As depicted in block 802, the continuing method 800 can include the step of determining a dominant network carrier in each geographic area of the first cluster of geographic areas based on a coverage rate of the home network carrier in each geographic area. For example, if the coverage rate of the home network carrier is above a predetermined threshold, the home network carrier is the dominant carrier, if the coverage rate is below the predetermined threshold, another network is determined to be the dominant network carrier a the respective geographic area. Based on a Carrier ID data included in the UE data, the network engine identifies an identity of the dominant network carrier within the first cluster of geographic areas.

As depicted in block 804, the method 800 can further include analyzing signal strength information associated with the dominant network carrier in each geographic area of the first cluster of geographic areas, and as depicted in block 806, based on the analyzing, the method 800 can further include calculating a location of an access point associated with the dominant network carrier providing service to the first cluster of geographic areas. Once the location of the dominant network carrier is calculated, the method can include displaying on the map, an indication of the access point associated with the dominant network carrier within the first cluster of geographic areas, as depicted in block 808.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for determining an optimal location for a new access point, the method comprising:
    retrieving user equipment (UE) data from a plurality of UEs, wherein the UE data comprises a service state and a geographic location of each UE of the plurality of UEs, wherein the service state comprises one of: an in-service state, an emergency only service state, or an out of service state;
    storing the UE data in a database of a network carrier;
    processing the UE data stored in the database to identify a plurality of geographic areas having a predetermined size;
    computing a coverage rate for each geographic area of the plurality of geographic areas using the UE data stored in the database of the network carrier, wherein the coverage rate is computed based on a first number of user equipment being in the in-service state, a second number of user equipment being in the emergency only service state, and a third number of user equipment being in the out of service state in the each geographic area of the plurality of geographic areas;
    determining a cluster of geographic areas from the plurality of geographic areas having the coverage rate that is below a predetermined threshold;
    determining a dominant network carrier in the cluster of geographic areas;
    analyzing signal strength information associated with the dominant network carrier in the cluster of geographic areas; and
    based on the analyzing, identifying a location of an access point of the dominant network carrier providing wireless communication services to UEs located in the cluster of geographic areas.

2. The computer implemented method of claim 1, wherein the optimal location for the new access point is determined based on the location determined for the access point of the dominant network carrier.

3. The computer implemented method of claim 1, wherein the in-service state comprises an in network service state or a roaming service state.

4. The computer implemented method of claim 1, wherein the each geographic area of the plurality of geographic areas is comprised of six latitude and longitude coordinate pairs on a map, wherein each latitude and longitude coordinate pair forms a vertex of a hexagon.

5. A computer implemented method for generating an interactive graphical user interface (GUI) configured to display network coverage information of a home network carrier, the method comprising:
    retrieving UE data from a plurality of user equipment (UE), wherein the UE data comprises a service state and a geographic location of each UE of the plurality of UE, wherein the service state comprises one of: an in-service state, an emergency only service state, or an out of service state;
    storing the UE data in a database of the home network carrier;
    processing the UE data stored in the database to identify a plurality of geographic areas;
    computing a coverage rate for each geographic area in the plurality of geographic areas using the UE data stored in the database of the home network carrier, wherein the coverage rate is computed based on a first number of user equipment being in the in-service state, a second number of user equipment being in the emergency only service state, and a third number of user equipment being in the out of service state in the each geographic area of the plurality of geographic areas;
    determining a first cluster of geographic areas in the plurality of geographic areas having a first coverage rate that is below a predetermined threshold;
    determining a second cluster of geographic areas in the plurality of geographic areas having a second coverage rate that is above the predetermined threshold; and
    displaying on the GUI a dynamic map, wherein the first cluster of geographic areas is shown with a first visual characteristic on the dynamic map, and wherein the second cluster of geographic areas is shown with a second visual characteristic on the dynamic map, wherein the first visual characteristic is visually distinct from the second visual characteristic.

6. The computer implemented method of claim 5, wherein the in-service state comprises an in network service state or a roaming service state.

7. The computer implemented method of claim 5, wherein the each geographic area of the plurality of geographic areas is comprised of six latitude and longitude coordinate pairs on a map, wherein each latitude and longitude coordinate pair forms a vertex of a hexagon.

8. The computer implemented method of claim 5, wherein the first visual characteristic comprises a first color and the second visual characteristic comprises a second color.

9. The computer implemented method of claim 5 further comprising:
    determining a dominant network carrier in the first cluster of geographic areas in the plurality of geographic areas;
    analyzing signal strength information associated with the dominant network carrier in each geographic area of the first cluster of geographic areas;
    based on the analyzing, calculating a location of an access point associated with the dominant network carrier providing service to the first cluster of geographic areas; and
    displaying on the dynamic map, an indication of the access point associated with the dominant network carrier within the first cluster of geographic areas; wherein the dominant network carrier is uniquely visually identified by coloring the each geographic area in the first cluster of geographic areas with a unique visual characteristic.

10. The computer implemented method of claim 9, wherein the displaying the location of the access point of the dominant network carrier on the dynamic map comprises displaying a distinct icon for the location.

11. A system for dynamically determining an optimal location for a new access point, the system comprising:
    a processor; and
    one or more computer storage hardware devices storing computer-useable instructions that, when used by the processor, cause the processor to:
    retrieve UE data from a plurality of user equipment (UEs), wherein the UE data comprises a service state and a geographic location of each user equipment of the plurality of UEs, wherein the service state comprises one of: an in-service state, an emergency only service state, or an out of service state;
    store the UE data in a database of a network carrier;
    process the UE data stored in the database to identify a plurality of geographic areas having a predetermined size;
    compute a coverage rate for each geographic area of the plurality of geographic areas using the UE data stored in the database of the network carrier, wherein the coverage rate is computed based on a first number of user equipment being in the in-service state, a second number of user equipment being in the emergency only service state, and a third number of user equipment being in the out of service state;
    determine a cluster of geographic areas from the plurality of geographic areas having the coverage rate that is below a predetermined threshold;
    determine a dominant network carrier in the cluster of geographic areas;
    analyze signal strength information associated with the dominant network carrier in the cluster of geographic areas; and
    based on the analyzed signal strength information, calculate a location of an access point of the dominant network carrier providing wireless communication services to UEs located in the cluster of geographic areas.

12. The system of claim 11, wherein the in-service state comprises an in network service state or a roaming service state.

13. The system of claim 11, wherein the each geographic area of the plurality of geographic areas is comprised of six latitude and longitude coordinate pairs on a map, wherein each latitude and longitude coordinate pair forms a vertex of a hexagon.

14. The system of claim 11, wherein the optimal location for the new access point is determined based on the location determined for the access point of the dominant network carrier.

* * * * *

UNITED STATES PATENT AND TRADEMARK OFFICE
CERTIFICATE OF CORRECTION

| | | |
|---|---|---|
| PATENT NO. | : 12,096,235 B2 | Page 1 of 1 |
| APPLICATION NO. | : 17/557958 | |
| DATED | : September 17, 2024 | |
| INVENTOR(S) | : Dennis Jarret Guill, Jr. et al. | |

It is certified that error appears in the above-identified patent and that said Letters Patent is hereby corrected as shown below:

On the Title Page

At item (73), Assignee, change:
"(73) Assignee: T-Mobile Onnovations LLC, Overland Park, KS (US)"
To:
--(73) Assignee: T-Mobile Innovations LLC, Overland Park, KS (US)--.

Signed and Sealed this
Twenty-second Day of October, 2024

Katherine Kelly Vidal
*Director of the United States Patent and Trademark Office*